United States Patent
Smith et al.

(10) Patent No.: US 9,399,600 B2
(45) Date of Patent: Jul. 26, 2016

(54) METHOD FOR PRODUCING A SINTERED COMPOSITE BODY

(75) Inventors: Jane Smith, Conventry (GB); Peter Chan, Leicestershire (GB); Michael Carpenter, Warwickshire (GB)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 530 days.

(21) Appl. No.: 13/825,646

(22) PCT Filed: Sep. 23, 2011

(86) PCT No.: PCT/EP2011/066575
§ 371 (c)(1),
(2), (4) Date: Mar. 22, 2013

(87) PCT Pub. No.: WO2012/038529
PCT Pub. Date: Mar. 29, 2012

(65) Prior Publication Data
US 2013/0303356 A1    Nov. 14, 2013

Related U.S. Application Data

(60) Provisional application No. 61/389,912, filed on Oct. 5, 2010.

(30) Foreign Application Priority Data

Sep. 24, 2010   (EP) .................................. 10179490

(51) Int. Cl.
| | | |
|---|---|---|
| *B22F 3/10* | (2006.01) | |
| *C04B 35/56* | (2006.01) | |
| *C22C 26/00* | (2006.01) | |
| *C22C 29/02* | (2006.01) | |
| *C04B 22/00* | (2006.01) | |

(52) U.S. Cl.
CPC ............... *C04B 35/5626* (2013.01); *B22F 3/10* (2013.01); *C04B 22/0013* (2013.01); *C22C 26/00* (2013.01); *C22C 29/02* (2013.01)

(58) Field of Classification Search
CPC ....................................................... C22C 29/08
USPC ............................................................ 75/238
See application file for complete search history.

(56) References Cited

U.S. PATENT DOCUMENTS

| | | | | |
|---|---|---|---|---|
| 4,342,595 | A * | 8/1982 | Bourdeau | 75/238 |
| 4,944,913 | A * | 7/1990 | Parsons et al. | 419/13 |
| 5,889,219 | A * | 3/1999 | Moriguchi et al. | 75/236 |
| 6,919,040 | B2 * | 7/2005 | Fries et al. | 419/16 |
| 2002/0011240 | A1 | 1/2002 | Kimura | |
| 2002/0172569 | A1 * | 11/2002 | Nakamura | 408/144 |

FOREIGN PATENT DOCUMENTS

| | | |
|---|---|---|
| EP | 0228715 A2 | 7/1987 |
| EP | 0256829 A2 | 2/1998 |
| JP | 57-123952 A | 8/1982 |
| JP | 57123952 A | 8/1982 |
| JP | 57185954 A | 11/1982 |
| JP | H07003306 | 1/1995 |
| JP | H07157837 A | 6/1995 |
| JP | 2000328170 | 11/2000 |
| JP | 2001220604 | 8/2001 |
| JP | 2003073766 | 8/2001 |
| WO | 0212578 A2 | 2/2002 |

* cited by examiner

*Primary Examiner* — George Wyszomierski
*Assistant Examiner* — Ngoclan T Mai
(74) *Attorney, Agent, or Firm* — Corrine R. Gorski

(57) ABSTRACT

The present invention relates to a method of producing a sintered composite body comprising cubic boron nitride particles dispersed in a cemented carbide matrix by sintering a mixture comprising cubic boron nitride particles and a cemented carbide powder at a sintering temperature below 1350° C. without applying a pressure.

9 Claims, No Drawings

METHOD FOR PRODUCING A SINTERED COMPOSITE BODY

RELATED APPLICATION DATA

This application is a §371 National Stage Application of PCT International Application No. PCT/EP2011/066575 filed Sep. 23, 2011 claiming priority of EP Application No. 10179490.7, filed Sep. 24, 2010.

The present invention relates to a method for producing a wear resistant sintered composite body comprising cubic boron nitride particles dispersed in a cemented carbide matrix.

BACKGROUND

Cemented carbides possess a unique combination of hardness, strength and wear resistance. Accordingly, they are used extensively in industrial applications such as cutting tools, drawing dies and wear parts. Cemented carbides generally comprise carbide particles such as tungsten carbide, vanadium carbide, titanium carbide, tantalum carbide, molybdenum carbide, zirconium carbide, niobium carbide and/or chromium carbide. These carbide particles are bonded together by means of a metal such as cobalt, nickel, iron and alloys thereof. The bonding metal is typically in the range 3 to 40 weight percentage. Parts are generally produced by sintering the cemented carbide at temperatures of the order 1400° C. and above to produce full density porous free bodies.

Cubic boron nitride (cBN) is a superhard material surpassed only by diamond in hardness and is widely used in applications such as machining tools, e.g. grinding wheels, cutting tools etc. cBN is created under conditions of elevated temperature and pressure and the material is crystallographically stable at temperatures below 1400° C. Cemented carbide-cBN composites consisting of cBN particles dispersed in a cemented carbide matrix are previously known. Generally these composites are manufactured using high pressure sintering techniques to avoid formation of the low-hardness hexagonal polymorph of boron nitride (hBN). However, manufacturing routes involving such sintering techniques are expensive which has resulted in attempts to develop less expensive techniques.

EP 0 774 527 discloses manufacturing of WC-Co-cBN composites using direct resistance heating and pressurized sintering. "Making hardmetal even harder with dispersed CBN", Metal Powder Report, Vol. 62, Issue 6, June 2007, p. 14-17, discloses an alternative direct resistance heating technique, Field Assisted Sintering Technology. The equipments used in such production methods, however, are suitable only for small batch volumes resulting in high production costs.

EP 0 256 829 discloses an abrasive and wear resistant material of cemented carbide containing cubic boron nitride and the manufacture thereof. However, the disclosed methods are still comparatively expensive or cannot provide the desired properties of a sintered composite body.

It is thus clear that there is still a need for a suitable production method for providing a sintered composite body comprising cubic boron nitride particles dispersed in a cemented carbide matrix.

SUMMARY

It is an object of the invention to provide a cost-effective method for producing a sintered composite body comprising cubic boron nitride particles dispersed in a cemented carbide matrix.

It is a further object of the invention to provide a highly wear resistant body comprising cubic boron nitride particles dispersed in a cemented carbide matrix.

It has been found that the above objective can be met by a method for producing a sintered composite body comprising sintering a mixture comprising cubic boron nitride particles and a cemented carbide powder at a sintering temperature below 1350° C. without applying a pressure.

It has been found that the further objective is met by a sintered composite body comprising a cemented carbide matrix with discrete cubic boron nitride particles dispersed throughout the cemented carbide matrix wherein the content of cubic boron nitride particles is 4 weight-% or less.

DETAILED DESCRIPTION

According to the present invention there is provided a method for producing a sintered composite body comprising sintering a mixture comprising cubic boron nitride particles and a cemented carbide powder at a sintering temperature below 1350° C. without applying a pressure. By without applying a pressure is herein meant a pressure equal to atmospheric pressure or less.

It was found that a densified cemented carbide matrix with discrete cubic boron nitride particles throughout the matrix could be achieved by using pressureless sintering, i.e. without applying a pressure by means of a gas, mechanical means, or other means, at a sintering temperature below 1350° C. The sintering may, thus, be performed in a conventional vacuum sintering furnace, i.e., with conventional electric heating elements transferring the heat to the mixture by convection and radiation, and a gas pressure equal to or less than atmospheric pressure. Quite surprisingly it was found that the sintering temperature for a cemented carbide could be lowered significantly with the introduction of cubic boron nitride particles into the cemented carbide mixture whilst still obtaining a fully densified sintered body. Moreover, the sintered body has a superior wear resistance.

Suitably the sintered composite body has a density of at least 99% of theoretical density for the sintered material.

Suitable processing steps comprise:
- mixing of powders, suitable using drymixing using powder process equipment such as oblicone, y-blender or lodige mixers
- compactation to form green bodies by, e.g., conventional pressing techniques, such as uniaxial, extrusion, drybag, etc.
- sintering of the green bodies on suitably coated barrier on graphite trays.

As an optional process step the mixture is compacted using cold pressing prior to sintering.

The sintering cycle is suitably according to conventional size furnace, but with special low sintering temperature, preferably at least 50° C. below nominal sintering temperature for the respective cemented carbide grade.

One exemplary, about 12 h long, sintering cycle comprises:
- stage 1: de-lubrication under hydrogen, including heating and holding for, e.g., about 1 h at 450° C.
- stage 2: pre-sintering in vacuum+partial pressure of Argon, including ramping up the temperature to sintering temperature with a ramping time of, e.g., 1 h
- stage 3: sintering under Argon for, e.g., 1 h
- stage 4: cooling under Argon for, e.g., about 7 hours.

Suitably, sintering is performed at a pressure of less than 200 mbar, preferably less than 100 mbar.

In one embodiment, sintering is performed in vacuum of less than 1 mbar, preferably less than $10^{-3}$ mbar.

In one embodiment, the sintering temperature is 1340° C. or below.

The sintering temperature is preferably above 1200° C., more preferably above 1250° C. If the sintering temperature is too low the resulting bodies have pores in an amount affecting the hardness and thus the wear properties negatively. Minor porosity may be acceptable, as this does not adversely affect the hardness. It is however preferred that the sintering temperature is chosen to achieve fully densified bodies.

A suitable sintering time is between 20 and 120 minutes. The sintering time is, however, suitably adjusted with regards to batch size, sintering equipment, the cemented carbide composition etc., to achieve dense sintered bodies whilst at the same time avoiding transformation of cBN to hBN.

In one embodiment, the sintering is performed in a vacuum sintering furnace.

In one embodiment, the sintered composite body is further treated by sinterhip or post hip using a pressure of less than 200 bar. The temperature is suitably below 1400° C. The treatment may be included in the sintering cycle, e.g., as a sinterhip step directly after sintering according to the invention, but before cooling. The sintering preceding the further treatment achieves a densified body with closed porosity. Alternatively, the treatment is performed as a separate treatment after a completed sintering cycle.

It is preferred that the mixture comprises an amount of cubic boron nitride particles of 4 weight-% or less.

In one embodiment, the mixture comprises an amount of cubic boron nitride particles of between 0.1 and 1.2 weight-%.

In another embodiment the mixture comprises an amount of cubic boron nitride particles of between 2.5 and 3.5 weight-%.

In one embodiment, the cubic boron nitride particles are coated with a thin layer comprising a metal element. Suitably the thickness of the layer is between 0.1 and 50 µm. In one exemplary embodiment the layer comprises titanium.

In one alternative embodiment, the cubic boron nitride particles are uncoated.

The amount of binder phase in the cemented carbide powder is suitably in the region 3 to 40 weight-%. Preferably the binder phase comprises cobalt, iron, or nickel, or mixtures thereof.

In one preferred embodiment, the amount of binder phase in the cemented carbide powder is between 6 and 16 weight-%.

Preferably the hard phase of the cemented carbide comprises at least 70 weight-% tungsten carbide.

In one embodiment, the amount of tungsten carbide in the cemented carbide powder is in the range 80 to 94 weight-%.

In one preferred embodiment, the cemented carbide powder comprises tungsten carbide and cobalt.

It was found that too high ratio cBN/Co may have undesired effects by agglomerates and subsequent partitioning during sintering.

In one embodiment, the weight ratio of cBN/Co is less than 0.35, preferably in the range 0.25-0.35.

In another embodiment, the weight ratio of cBN/Co is in the range 0.01-0.03.

In yet another embodiment, the weight ratio of cBN/Co is in the range 0.06-0.08.

The sintered composite body in accordance with the present invention comprises a cemented carbide matrix with discrete cubic boron nitride particles dispersed throughout the cemented carbide matrix wherein the content of cubic boron nitride particles is 4 weight-% or less.

Suitably, the sintered composite body has a fully densified cemented carbide matrix.

Surprisingly it was found that wear characteristics improved with decreasing content of cubic boron nitride particles down to a certain level.

In one embodiment, the sintered composite body has a content of cubic boron nitride particle between 0.1 and 1.2 weight-%. One preferred range is between 0.6 and 1.0 weight-% cubic boron nitride particles in the sintered composite body.

The cubic boron nitride particles preferably have a particle size between 1 and 100 µm. In one embodiment the cubic boron nitride particles have a mean particle size between 1 and 25 µm. In one alternative embodiment the cubic boron nitride particles have a mean particle size between 12 and 35 µm, preferably between 14 and 25 µm.

In one embodiment, the cemented carbide comprises a hard phase comprising tungsten carbide and a binder phase comprising cobalt, iron, or nickel, or mixtures thereof. Further alloying elements in the binder phase, such as chromium and/or molybdenum, may be suitable in certain application, e.g., when improved corrosion resistance is advantageous. Suitably the content of chromium and/or molybdenum is between 12 and 16 weight-% of the binder phase.

In one exemplary embodiment, a corrosion resistant binder phase consists of nickel, chromium and molybdenum.

In one embodiment, the cemented carbide comprises between 80 and 94 weight-% tungsten carbide and between 6 and 16 weight-% binder phase, preferably comprising cobalt.

Suitably the grain size of the tungsten carbide particles is in the range 0.1 to 15 µm.

The present invention further relates to a sintered composite body obtainable by the method.

The present invention further relates to the use of the sintered composite body as a wear part.

In one embodiment, the sintered composite body is used as an oil and gas stabiliser blank.

In another embodiment, the sintered composite body is used as an insert in a roller cone bit.

Example 1

Cemented carbide/cBN composite grades with compositions as per Table 1 were manufactured according to the process of the invention using WC with a Fisher sub sieve size analysis grain size of about 3 µm. Time at sintering temperature was about 1 h.

TABLE 1

| Sample | A | B | C | D | reference |
|---|---|---|---|---|---|
| WC | balance | balance | balance | balance | balance |
| Co (wt %) | 11 | 11 | 11 | 11 | 11 |
| cBN (d50, µm) | 20 | 20 | 20 | 15-20 | — |
| cBN (wt %) | 0.8 | 0.2 | 3 | 0.8 | 0 |
| cBN coating | Ti | Ti | Ti | — | — |
| sintering temperature (° C.) | 1300 | 1300 | 1300 | 1300 | 1410 |
| d WC (µm) | 3 | 3 | 3 | 3 | 3 |

The composite cemented carbide/cBN candidate grade test coupons were tested for physical and micro structural properties according to ISO4505. The materials were also tested for ASTM B611 abrasion resistance. The results are shown in Table 2.

TABLE 2

| Sample | A | B | C | D | reference |
|---|---|---|---|---|---|
| Hv30 | 1274 | 1298 | 644 | 1286 | 1250 |
| density (g/cm$^3$) | 13.99 | 14.34 | 12.88 | 14.04 | 14.44 |
| Porosity (ISO4505) | A02B00 C00 | A02B00 C00 | A02B00 C00 | A02B00 C00 | A02B00 C00 |
| Wear Number (ASTM B611) | 10.3 | 8.5 | 9.7 | 10.4 | 6.0 |

The invention claimed is:

1. A method of producing a sintered composite body of cubic boron nitride particles dispersed in a cemented carbide matrix comprising the step of sintering a mixture of cubic boron nitride particles and a cemented carbide powder at a sintering temperature below 1350° C. without applying a pressure.

2. A method according to claim 1, wherein the pressure is less than 200 mbar.

3. A method according to claim 1, wherein the temperature is 1340° C. or below.

4. A method according to claim 1, wherein the sintering temperature is above 1200° C.

5. A method according to claim 1, wherein a sintering time is between 20 and 120 minutes.

6. A method according to claim 1, wherein the sintering is performed in a vacuum sintering furnace.

7. A method according to claim 1, wherein the mixture comprises an amount of cubic boron nitride particles of 4 weight-% or less.

8. A method according claim 1, wherein the cemented carbide powder comprises an amount of binder phase of between 6 and 16 weight-%.

9. A method according to claim 1, wherein the cemented carbide powder comprises tungsten carbide and cobalt.

\* \* \* \* \*